United States Patent [19]
Egan et al.

[11] Patent Number: 5,548,745
[45] Date of Patent: Aug. 20, 1996

[54] METHOD AND APPARATUS FOR DESIGNATING CONTEXT IN A WINDOWING ENVIRONMENT

[75] Inventors: Alistair Egan, Lake Forest; Thomas S. Tullis, Laguna, both of Calif.

[73] Assignee: Canon Kabushiki Kaisha, Tokyo, Japan

[21] Appl. No.: 5,450

[22] Filed: Jan. 19, 1993

[51] Int. Cl.⁶ ........................................... G06F 9/00
[52] U.S. Cl. ................... 395/500; 364/281.7; 364/282.3; 364/286.3
[58] Field of Search ..................... 395/500, 600, 395/650

[56]     References Cited
U.S. PATENT DOCUMENTS 5,097,533  3/1992  Burger et al. ........................ 395/500
5,119,465  6/1992  Jack et al. .......................... 395/500
5,313,581  5/1994  Giokas et al. ........................ 395/200
5,349,680  9/1994  Fukuoko ............................. 395/800

*Primary Examiner*—Kevin J. Teska
*Assistant Examiner*—Ayni Mohamed
*Attorney, Agent, or Firm*—Fitzpatrick, Cella, Harper & Scinto

[57]     ABSTRACT

A method and apparatus for defining a context environment of an editor applet which is processing data to be stored in a container applet. In the invention, a first applet is executed and the context environment indicative of the first applet is stored. A second applet is executed and examines the stored context environment indicative of the first applet. In accordance with the result of the examination, the second applet modifies its operation.

29 Claims, 10 Drawing Sheets

STATIC TOOLS

STATIC TOOLS

NEW BUTTONS
(DYNAMIC)

SCREEN I

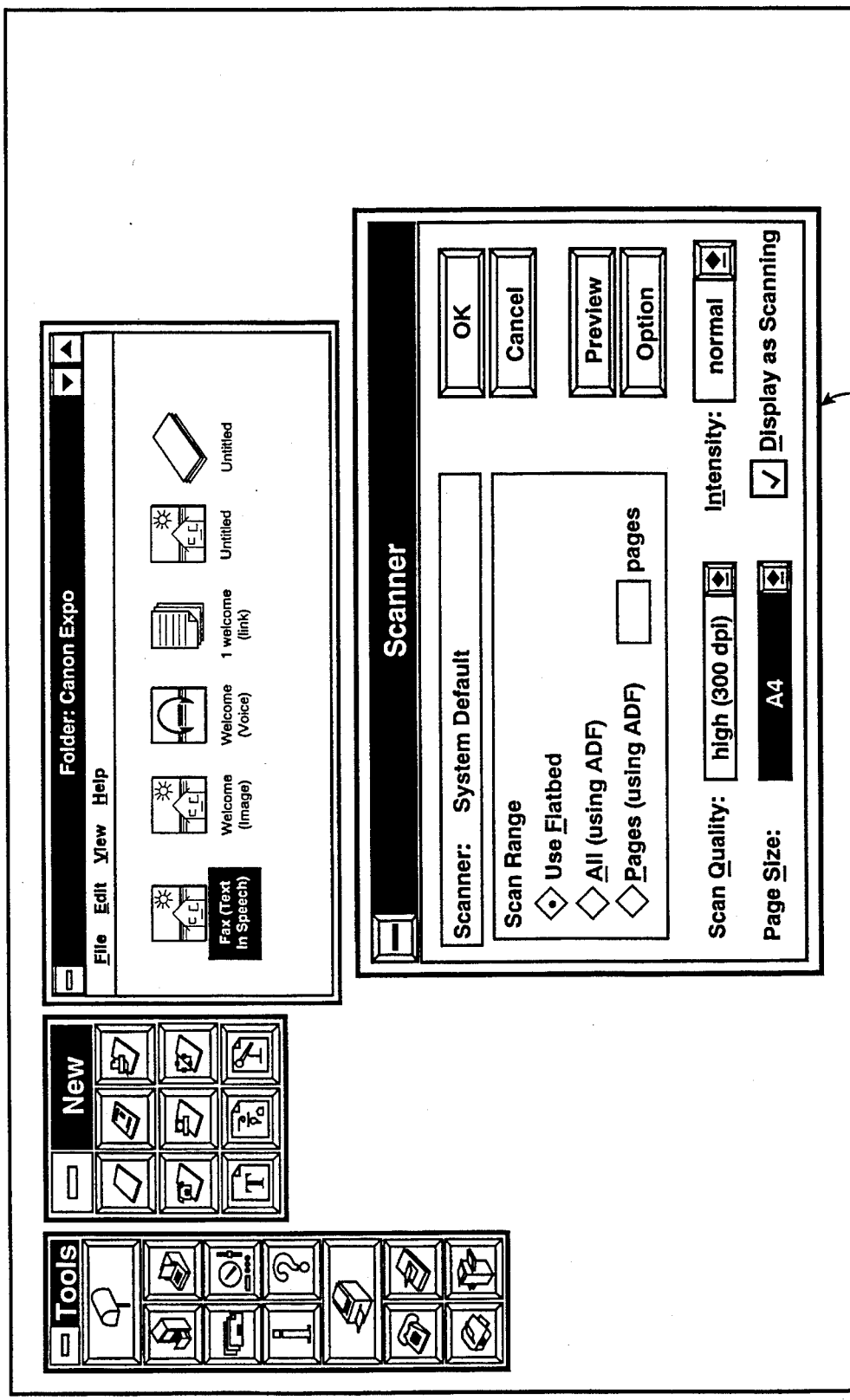
FIG.7  SCREEN 2

SCREEN 3

METHOD AND APPARATUS FOR DESIGNATING CONTEXT IN A WINDOWING ENVIRONMENT

BACKGROUND OF THE INVENTION

1. Field of the Invention

The present invention generally relates to a method and apparatus for designating context for an application program (commonly referred to as an "applet") in a windowing environment. More particularly, the present invention relates to a method and apparatus for designating the context within which an applet is to be executed, such as the context defined by a container applet when execution of an editor applet is initiated, and in which the editor applet must operate until the completion of its function.

2. Description of the Related Art

Window application products such as Microsoft Excel for Windows® are known as a software application for performing and processing tasks by jumping between user selected application programs (hereinafter "applet"). Each applet is an independent function, such as an input function or an output function, and collectively the applets permit the operator to perform a specific task.

There are at least two types of applets: a container-type applet or an editor-type applet. Container applets represent containers in which data or other containers are to be held. For example, a container applet such as a "file cabinet" is a type of container ordinarily at the top of the hierarchy of containers. A file cabinet contains folders, messages, and data objects, each of which is also a container. A container applet could also be a folder which may be a general folder or a mailbox folder. A container applet may also be a message wherein the message may be a facsimile message, phone message, modem message or an E-mail message. All of the above folders and messages may be contained in the file cabinet container.

On the other hand, editor applets create or manipulate data to be stored in a designated container such as a general folder or a facsimile message. Editor applets ordinarily do not permanently store data. For example, a message editor edits a message that is stored in a general folder or may request the message to be faxed.

Upon initiating an editor function, the container applet may provide the editor applet with information such as a parameter as to how to process data for the container. For example, a facsimile message container must designate parameters for the scanner editor in order for it to store scanned data into the facsimile message container in the proper format. On the other hand, a general folder need not set any parameters since this container can accept data in any form. In addition, the container applet must also designate a database in which the data created by an editor is to be stored upon completion of the editor function.

Since a container must designate the parameters and designate the location for data to be deposited, problems arise when more than one container is open and there is only one editor applet operating. That is, in the case where more than one container is open, the calling container might no longer be "in focus". The editor applet, upon completing its function, will deposit its data with the container which is in focus or the editor may try to deposit the data in a container which no longer exists.

Heretofore, an editor applet has not been able to determine how to initialize its operation, how to complete its operation based on a context of the container applet, or where to deposit its data in the case where the calling container applet is closed. Consequently, windowing application programs do not operate in the manner in which the user intuitively expected the integrated application program to perform.

SUMMARY OF THE INVENTION

It is an object of the present invention to address the foregoing difficulties.

In one aspect, the invention provides a method for defining a context environment of an editor which is creating data for a designated container. More particularly, the method provides a first executing step for executing a first applet and storing a context environment indicative of the first applet. A second executing step executes a second applet whereby the second applet operates to examine the stored context environment indicative of the first applet and the second applet modifies its execution in accordance with the result of the examination step.

According to another aspect of the invention, there is provided a method for designating a window integrated application program context environment by executing a first integrated application program and storing a context environment corresponding to the first integrated application program, and executing a second integrated application program. The operation of the second integrated application program is modified in accordance with the context environment of the first integrated application program, and the context environment of the first integrated application program is maintained throughout the operation of the second integrated application program.

According to another aspect of the present invention, an apparatus for defining a context environment of a second applet which is processing data in conjunction with a first applet comprises a memory for storing a plurality of applets, a selector for selecting at least a first applet and a second applet from the plurality of applets, and a processor for 1) executing the first applet, 2) storing a context environment indicative of the first selected applet, 3) executing the second selected applet, 4) examining the stored context environment indicative of the first applet, and 5) modifying the execution of the second applet in accordance with the result of the examination.

In a further aspect of the invention, an apparatus designates a context environment for a window integrated application program. According to this aspect, a memory stores integrated application programs, a selector selects at least a first integrated application program and a second integrated application program from memory, whereby a processor executes the first integrated application program and stores a context environment corresponding to the first integrated application program. The processor executes the second selected integrated application program, modifies operation of the second selected integrated application program in accordance with the context environment of the first selected integrated application program, and maintains the context environment of the first selected integrated application program until the second selected integrated application program has completed its function.

BRIEF DESCRIPTION OF THE DRAWINGS

FIG. 7 is a view of Screen 2 for explaining how an editor window is modified in accordance with folder container context;

DETAILED DESCRIPTION OF THE PREFERRED EMBODIMENT

The present invention can be used in a system having multimedia message handling capabilities as well as multimedia message processing capabilities for sending and receiving messages over many different medias. Such a system is described in U.S. application Ser. No. 07/808,757 filed Dec. 17, 1991, and now abandoned, "Method And Apparatus For Sending And Receiving Multimedia Messages", the contents of which are incorporated by reference as if set forth in full herein. The present invention is implemented for controlling the operation of many different applets which are divided into container applets and editor applets such as the system illustrated in FIG. 3. In this system, the editor applets operate either as a hardware functions such as scanner functions or to control software functions such as a spell check editor in order to create or manipulate data. Container applets operate to create storage for data which contains the created message to be sent via one or more media types.

Figure 1:
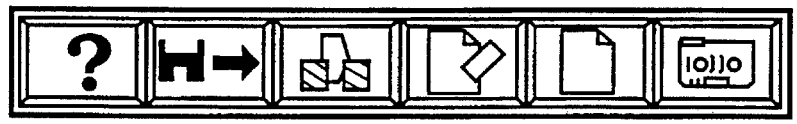
FIG. 1 is an illustration of a conventional static tool palette display.
Figure 2:
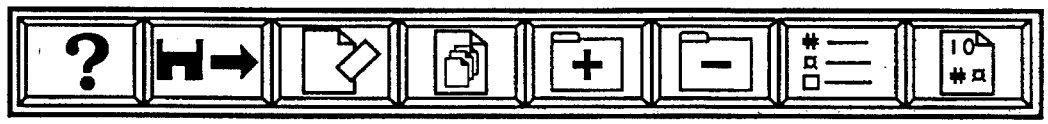
FIG. 2 is an illustration of a conventional dynamic tool palette display.
Figure 3:
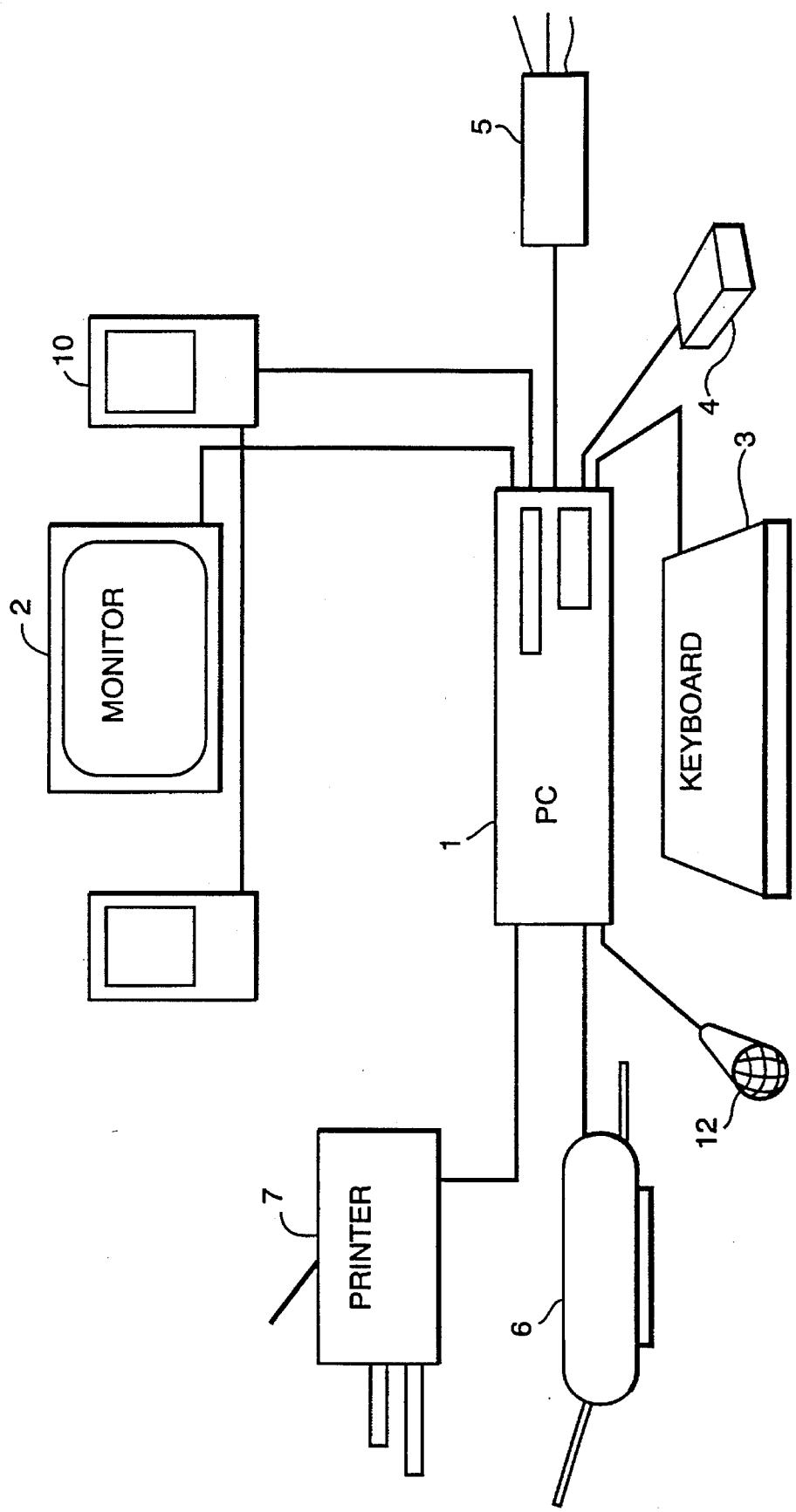
FIG. 3 is a diagram showing a system implementing the present invention.

As shown in FIG. 3, there is a personal computer 1 which is connected to monitor 2, keyboard 3, and mouse 4. Personal computer (PC) 1 is coupled to facsimile machine 5, scanner 6, and printer 7 by which it can receive/send messages on many different media. Also coupled to PC 1 is voice synthesizer 10, microphone 12, and telephone 13 (not shown). In the above configuration, PC 1 has the capability of handling messages of different media such as optical character recognition (OCR), text-to-speech, and E-mail. PC 1 has the ability to access each type of media through the above-mentioned applets. By accessing different applets, PC 1 can create messages and receive messages.

Figure 4A:
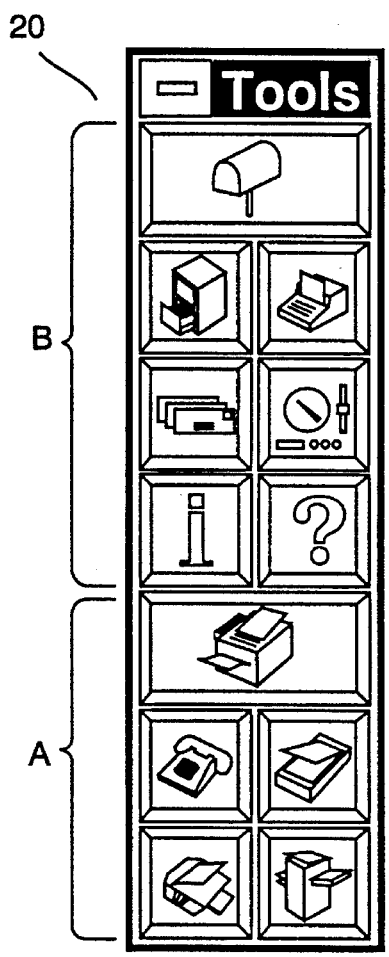
FIG. 4 is an exemplary view of the static and dynamic tool palette of the present invention.
Figure 4B:
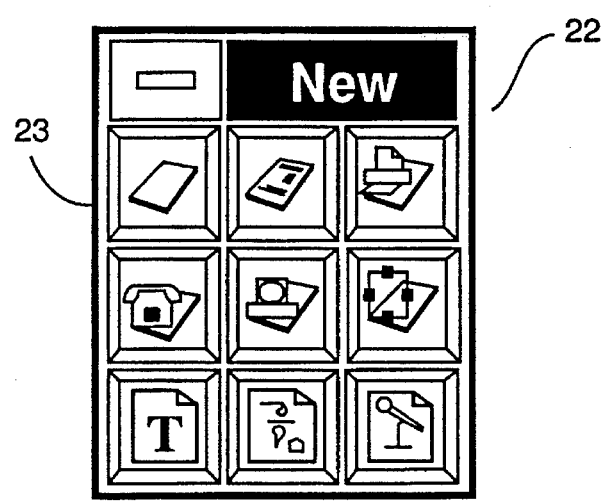

Upon initial operation of the window application, a default context formats static tool display 20 and dynamic tool palette display 22 as illustrated in FIG. 4 onto monitor 2. The default display occurs at initial operation because a context environment has not been defined by the program. In this state, the window application displays a number of object functions or tools which correspond to the available hardware function such as scanner 6, printer 7, and facsimile 5 as illustrated at 20A of FIG. 4. In addition to the hardware functions, there are also illustrated in static tool palette display 20 software functions at 20B, such as file cabinet, mail, help, and message log.

In FIG. 4, static tool palette display 20 resides in the upper left-hand corner of the screen and does not change its location or appearance throughout the entire operation of the window application (unless the user explicitly moves the static tool palette). In addition, static tool palette display 20 continuously displays the same tools regardless of the context. The displayed tools are always operative regardless of the context, and thus all tool buttons are always active and the operator can select any one of them at any time. In this fashion, the user can readily locate and initiate commonly used functions.

Dynamic tool palette display 22, on the other hand, is a separate display which resides to the right of the static tool display 20. In addition, dynamic tool palette display 22 alters its size, shape, and contents in accordance with the context of the currently operating applet. For example, in the case the user selects folder icon 23, a new folder window is called to the foreground and its context is registered. Dynamic tool palette applet 24 (not shown) displays the applicable tools for that container. Preferably, the tools in the dynamic tool palette are always active and the operator can select any one of them to initiate the corresponding functions.

In operation, upon selecting the folder applet, the applet for that function is downloaded from a file server and stored in a random access memory (RAM) from where it can be executed. After the folder applet is downloaded from the file server, its context which includes a program handle and database identification number is registered with a context manager applet 21 shown in FIG. 6. In the present invention, context manager 21 resides as part of the static tool palette display applet 20. However, context manager 21 may also be a separate applet which operates throughout the present program.

In accordance with the stored context, dynamic tool palette applet 24 examines the registered context. Based on the examination result, the dynamic tool palette display applet determines whether to modify its tool display. After determining the required tool functions based on the context, display 22 is modified and displayed with those tool functions which apply to the currently running folder applet.

Once the applicable tool palettes are displayed, the user may select an editor function for producing data to input into the open folder. In the present invention, the static tool palette display 22 is separate from dynamic tool palette display 20 and remains displayed on the screen regardless of the currently operating applet. In addition, static tool palette displays 20 always maintains the same tool selections. On the other hand, the dynamic tool palette display 22 is modified in accordance with the context of the currently operating applet.

Figure 5:
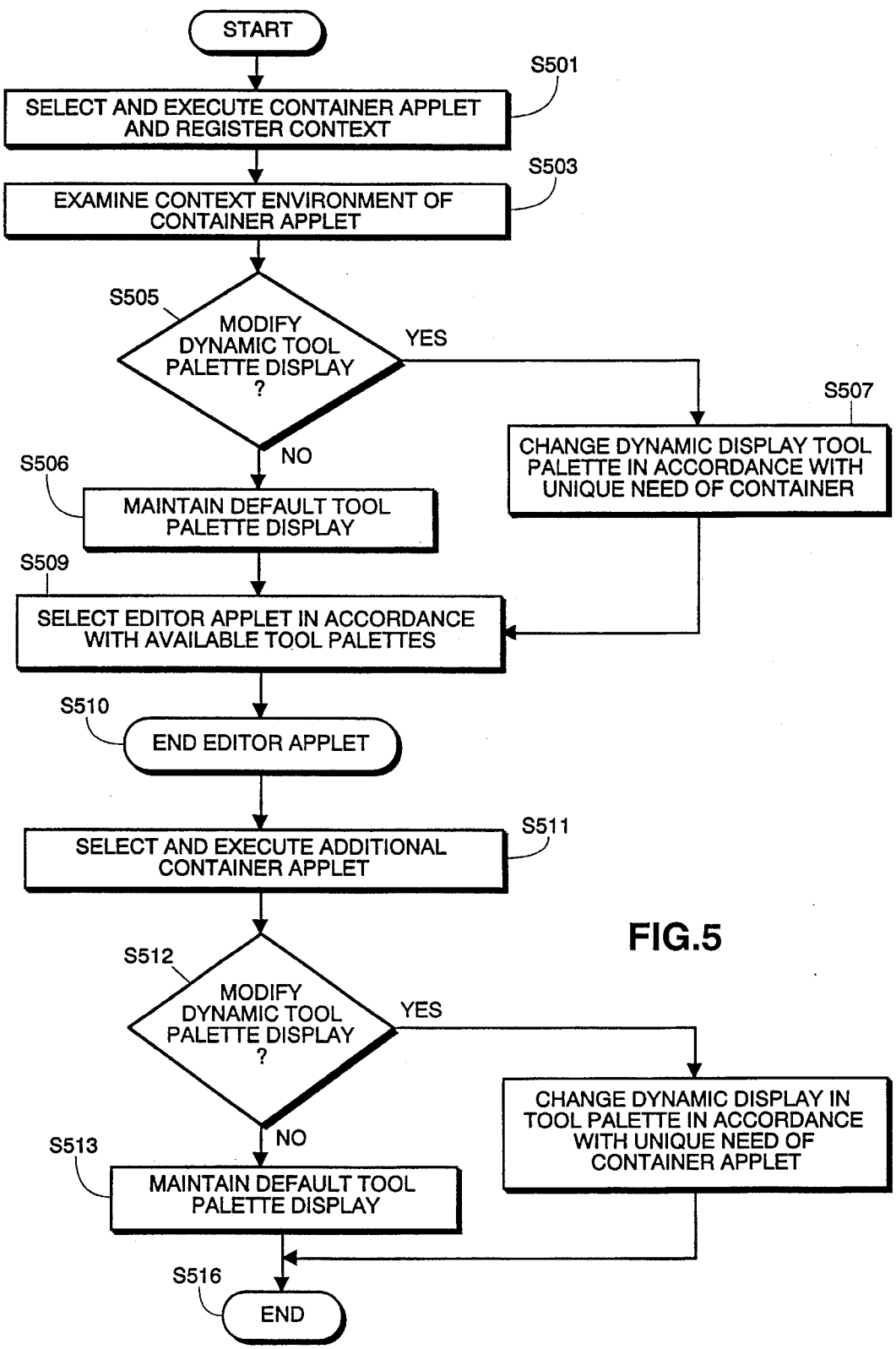
FIG. 5 is a flowchart explaining how the dynamic tool palette display is modified by a context.

A more detailed discussion of the method of modifying and displaying the dynamic tool palette 22 will be provided below with reference to the flowchart illustrated in FIG. 5.

Upon selecting and executing a container applet in step S501, the context environment of the container applet is registered with context manager 21. At step S503, dynamic tool palette display applet 24 examines the stored context. In step S505, dynamic tool palette display applet 24 determines if the current database identification is valid and determines whether to modify its dynamic tool palette display based on the current context. In the case that the display is not to be modified in step S506, the dynamic tool palette applet maintains a default tool palette display. However, in step S507, if it is determined that the dynamic tool palette display database is to be modified, dynamic tool palette display applet 24 determines the required tools to display in accordance with the context.

After the new tool palette has been displayed or the default tool palette has been maintained, an editor function can be selected from among the available tool functions.

In step S510, the editor application has completed its function and stored the created data in the database designated by the stored database identification. In step S511, a second container applet is open at which point dynamic tool palette display applet 24 examines and determines whether to modify the tool palette display.

If it is determined that the context does not require modification, for example, in the case of a folder, all tool functions are applicable, then a default display will be maintained in step S513. However, if it is determined that the context of a container requires less than all of the tools or that some tools are not relevant, for example, in the case of a voice message, the image editor function is not required, then in step S515 the dynamic tool palette display database is modified thereby modifying the dynamic tool palette display 22.

At this point, steps S501–S515 can be repeated for as many functions necessary to complete a task. Once a task has been completed and all applets have been terminated, dynamic tool palette display applet 24 can be terminated in step S516.

Figure 6:
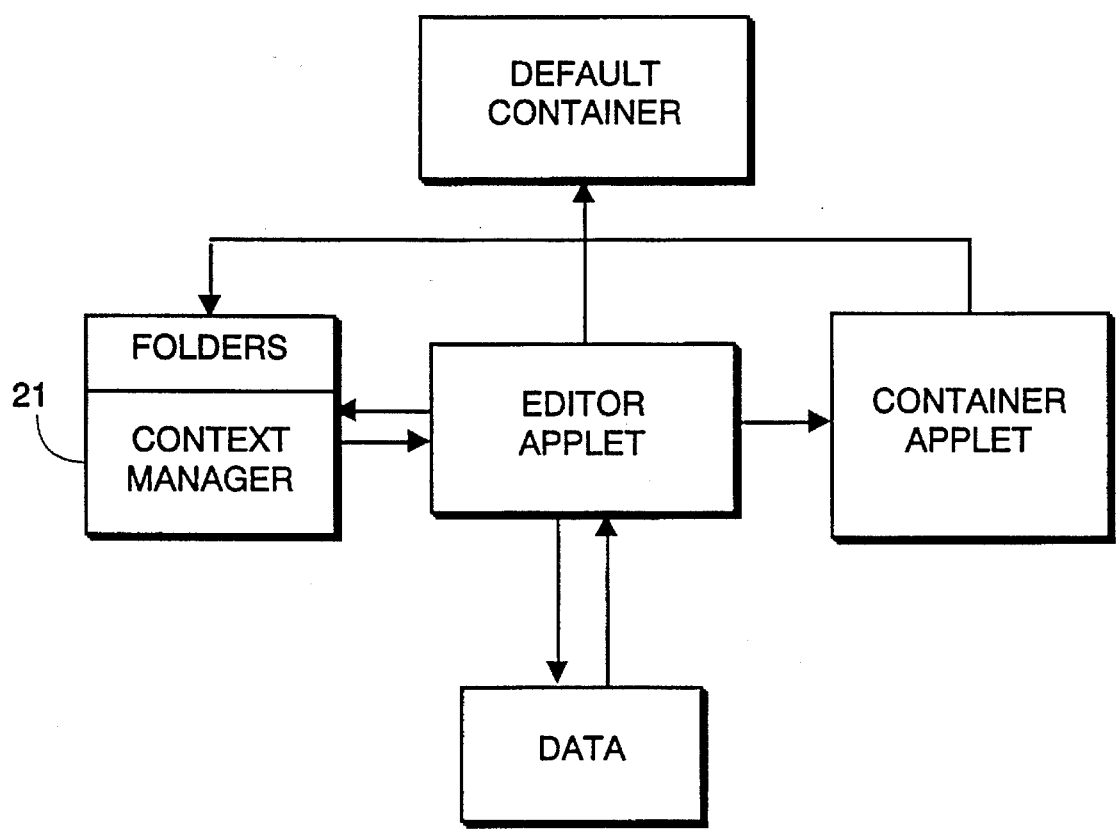
FIG. 6 is a block diagram illustrating how context is registered in the context manager.
Figure 6A:
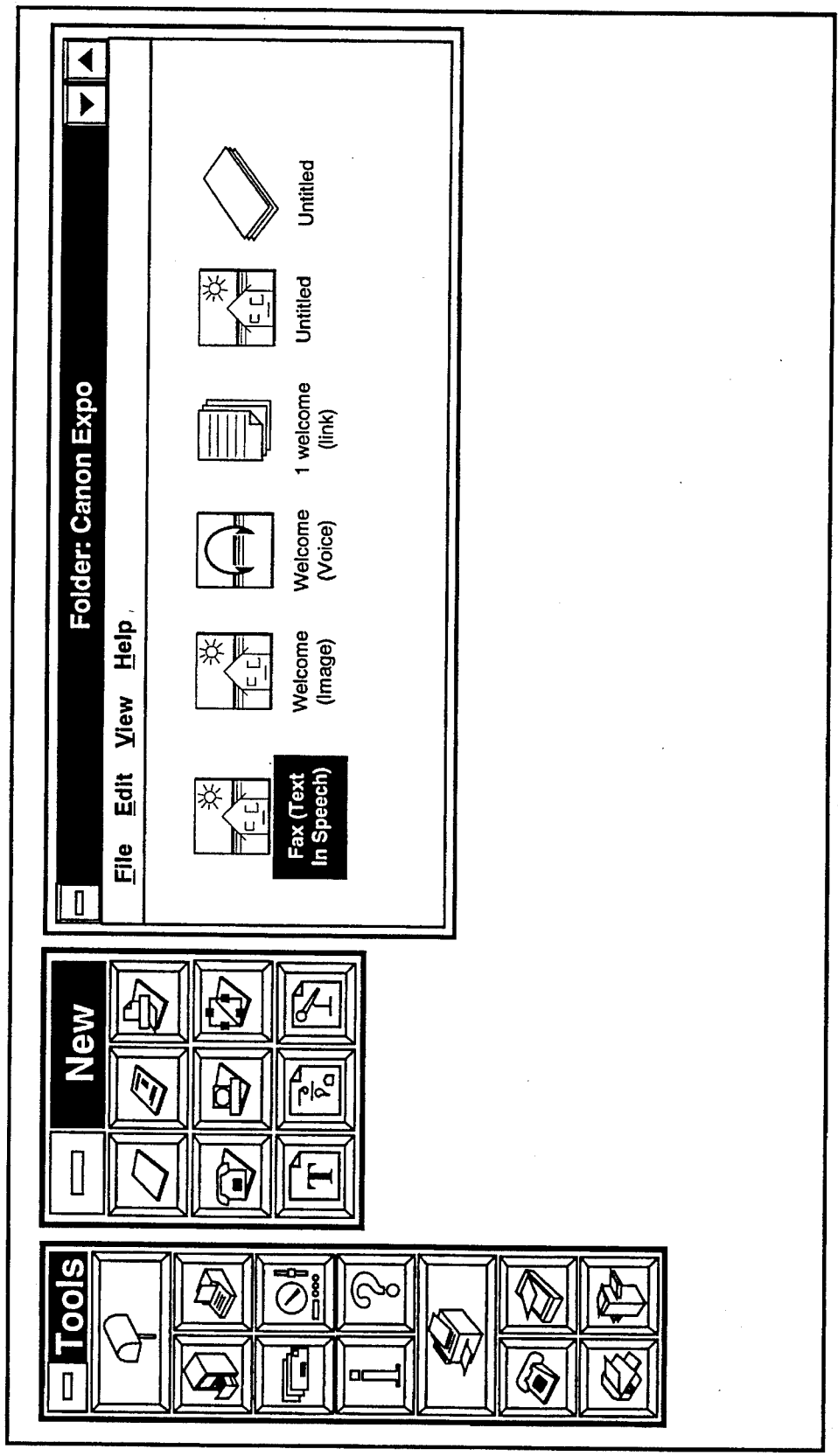
FIG. 6A is a view of Screen 1 for explaining how a window is modified in accordance with context.
Figure 8:
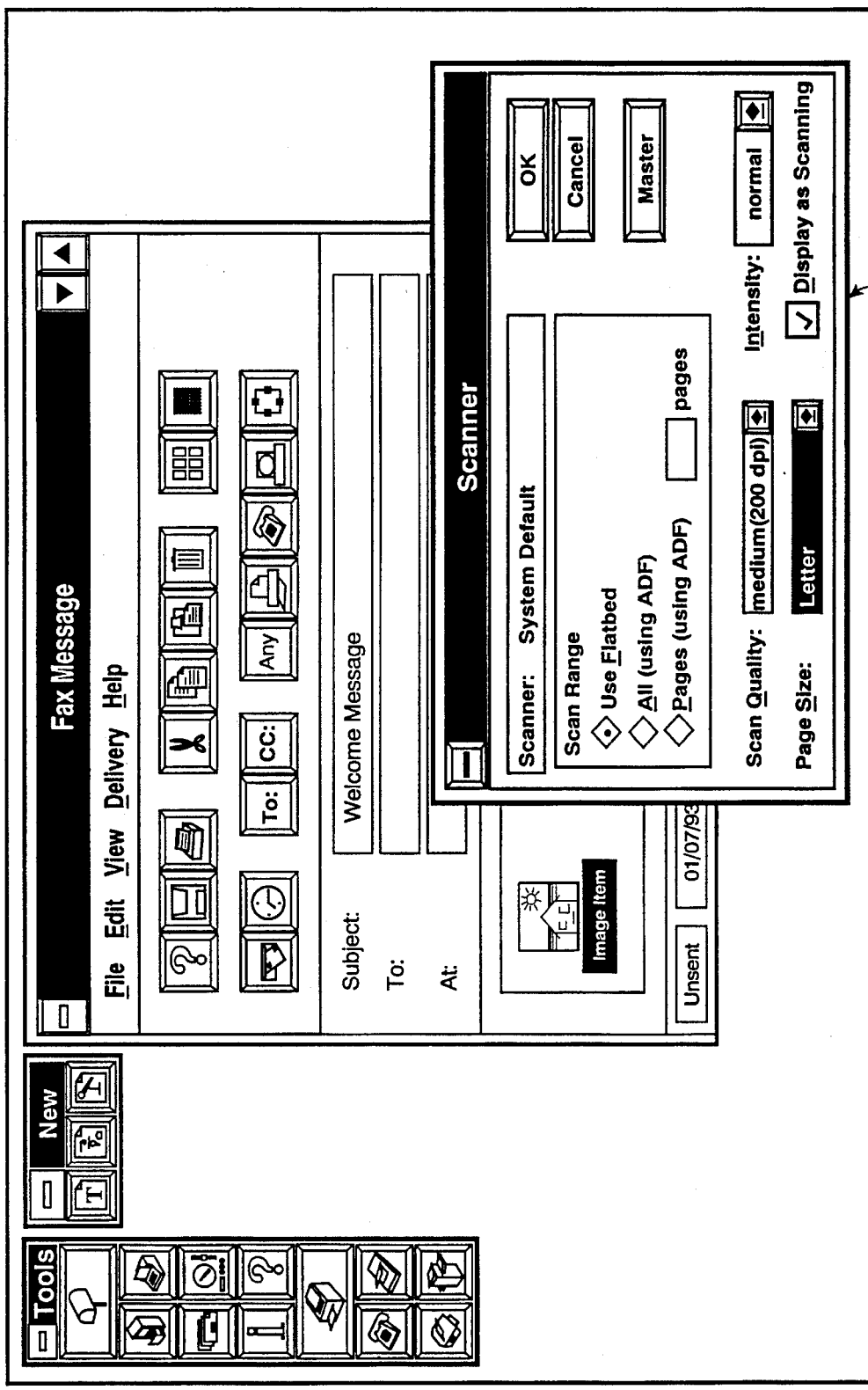
FIG. 8 is a view of Screen 3 for explaining how a scanner window is modified by a fax message container.

The operation of the window application will now be explained with reference to FIGS. 6–9. Upon initialization of the window program, static tool palette display 20 or dynamic tool display 22 appear in a default state. As shown in FIG. 6, after selecting a tool to create a container from either tool palette 20 and 22, a container applet such as a folder applet registers its context and database identification with the static tool display palette applet (hereinafter "context manager") 21, dynamic tool display palette editor 22 examines registered context and modifies its display database accordingly. In the case of the folder container, all dynamic tool functions are applicable to the folder context as displayed in Screen 1 of FIG. 6A.

After the folder has been created by the folder applet, an editor function is selected to create data to input into the folder. As illustrated in Screen 2 of FIG. 7, a scanner editor has been selected as depicted by scanner editor window 30. Upon selecting the scanner editor, the scanner applet is downloaded from the file server, stored in RAM, and executed therefrom. Once the scanner applet is executed, the scanner applet examines the currently stored context, determines whether the current context is compatible with its function, and, in the case the context is compatible, the scanner applet modifies its operation to process data in accordance with the folder applet context.

In addition to modifying the operation of the scanner applet, scanner window 30 is also modified either to present further options to be selected or to instruct the user to initiate the scanner. For example, in Screen 2 of FIG. 7, scanner window 30 appears in its most general form with many options for the user to select. As shown in Screen 2, scanner window 30 permits the user to enter features for scanning such as Scan Quality (in dpi), Page Size (letter, A4, etc.), and Intensity Level. There is also provided an OPTION button in scanner window 30 which permits the user to select further option features if desired.

An editor applet changes its operation as well as its window display in accordance with the context of the container applet. As shown in Screen 3 of FIG. 8, the container for holding data has been changed to a fax message container. The scanner applet examines the context registered in context manager 21 and determines that the parameters for a fax message are to be set in accordance with predetermined features. As shown, static tool display palette 20 remains in the same position with the same tools for the convenience of user selection. Once the facsimile message applet registers its context with context manager 21, dynamic tool palette display editor 25 (not shown) examines the current context and modifies its display database, if necessary. In the present case, dynamic tool display palette 22 is modified from its previous display in FIG. 7 to the display illustrated in FIG. 8.

After the scanner editor has been selected, the scanner applet examines the current context. Since the current context is a facsimile message, the scanner applet modifies its operation in accordance with predetermined parameters set by the context of the facsimile message. After the scanner applet has modified its operation, the scanner applet presents its scanner editor window without permitting the user to select scanner options.

In the fax message context, scanner window 30 has the appearance as shown in Screen 3. Screen 3 shows that the Scan Quality parameter, the Intensity parameter, and Page Size parameter have been preset. In addition, the OPTION button is removed from scanner window 30. As a result, the user cannot select features for creating the form of the data. Here, the scanner editor applet determines its own operation mode based on previously determined parameters for producing a facsimile message. After completing the scanning operation, the scanning applet downloads the process data into the appropriate container (fax message) in accordance with the stored context.

Figure 9:
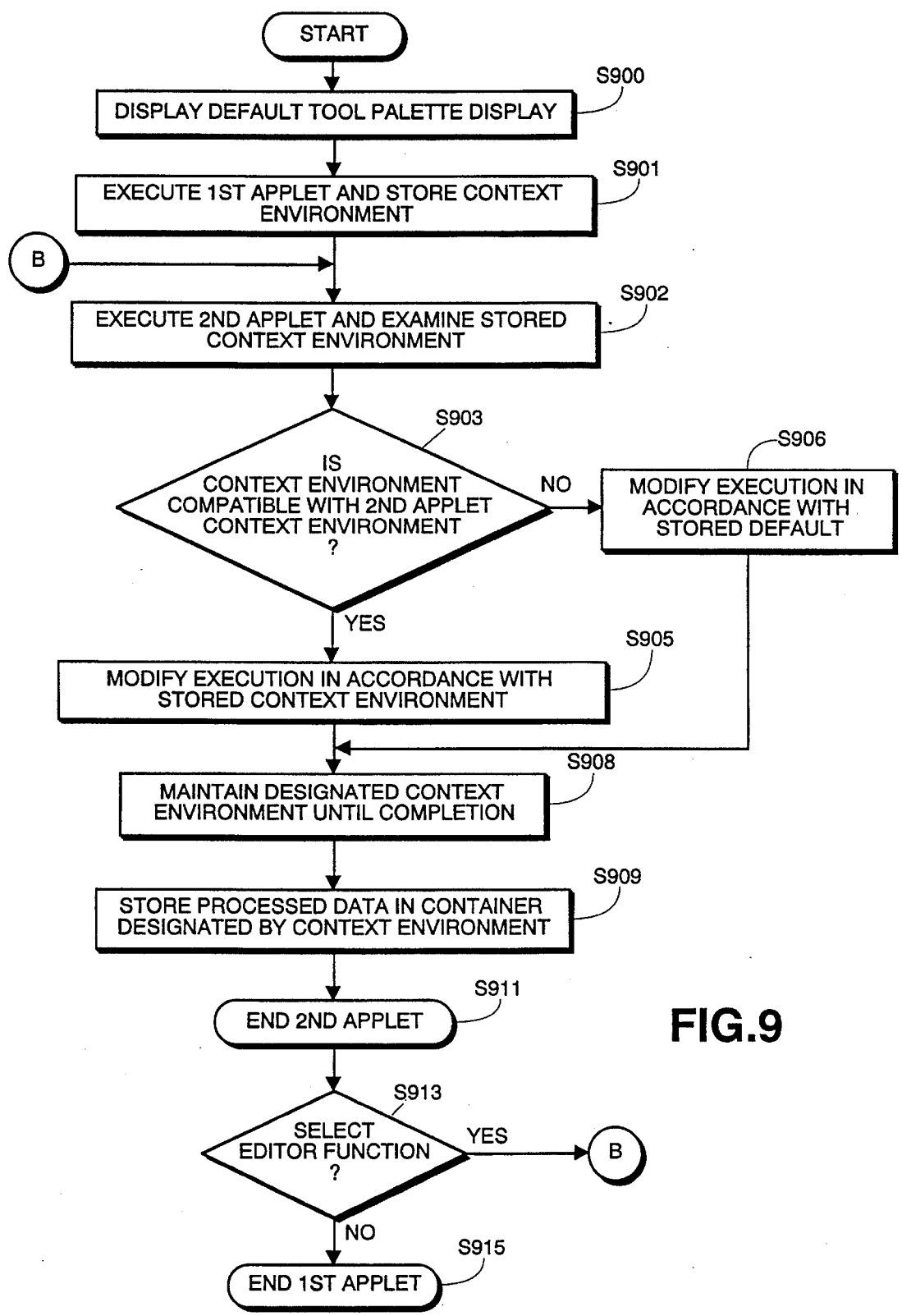
FIG. 9 is a flowchart explaining how a context is designated for an editor applet.

A more detailed discussion of the method of modifying the context of an editor applet will be provided below with reference to the flowchart illustrated in FIG. 9.

Upon initialization of the window application, a default context is recognized and the default tool palette for both the static and dynamic tool palettes are displayed on monitor 2 in step S900. In step S901, a container applet is selected in order to create a container for holding data. Upon selecting a container applet, the container applet is downloaded from the file server and stored in a RAM location for execution. The context of the container applet which contains the container's handle and database identification is registered with context manager 21 in step S902. After the container context has been registered and the container created, an editor applet is selected and executed in step S903. At this point, the editor applet examines the context of the current container which is stored in context manager 21. In step S903, the editor applet determines if the context environment is suitable for its function.

In the case that the context environment is suitable for the function of the editor applet, the editor applet modifies its operation and window display in accordance with the stored context environment in step S905. However, in the case the context environment of the container applet is not compatible, the editor applet operates in accordance with a predetermined stored default context environment in step S906. In step S908, the editor applet maintains the designated context until its processing operation is complete. Once the processing of the editor applet is complete in step S909, the processed data is deposited in the container designated by the context database identification stored in context manager 21. In step S911, the editor applet ends its operation and returns control to the container applet. Finally, in step S913, if it is determined that further editor functions are desired, flow returns to step S902. However, if no further editor functions are desired in step S915, the container applet is closed out and its operation is ended.

SECOND EMBODIMENT

The following is a description of a second embodiment of the present invention in which multiple contexts are set.

As explained above, the container applet registers a single context with context manager 21 which is used by an editor if the context is suitable for the editor function. However, there is a possibility that the editor applet determines that the current context is not compatible with its function, for example, a scanner context for a text-to-speech editor. In this case, an editor applet performs its function in a predetermined default context environment. Since the default context may not be known by the user, the operation of the program may become confusing. Accordingly, the present embodiment allows an editor to operate in a previously registered context which is suitable for its operation. In this embodiment, the container applet can set a multiple context for all editor applets.

Figure 10:
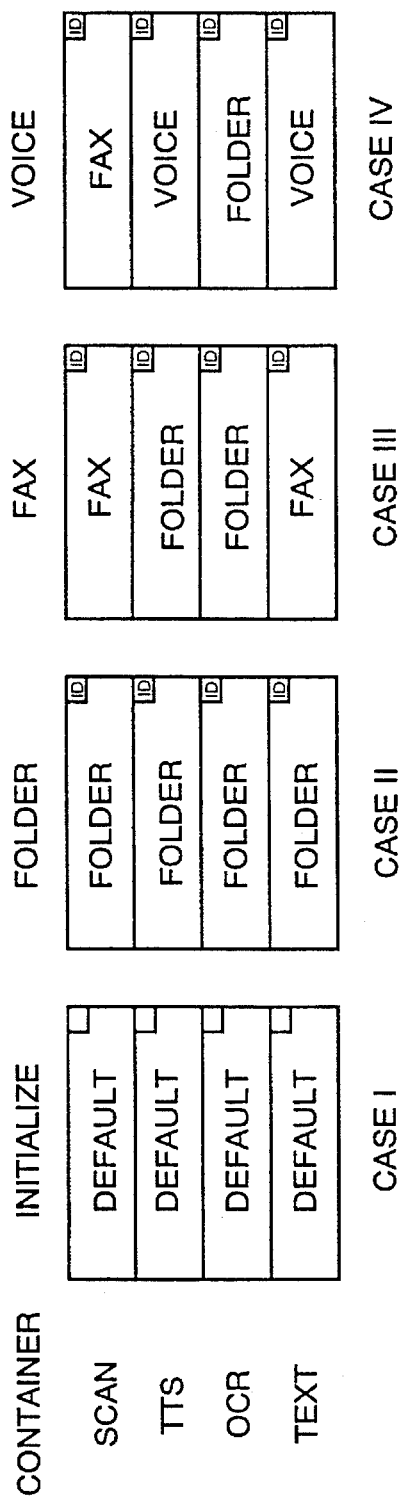
FIG. 10 is a chart for explaining the multi-context embodiment.

The operation of the second embodiment will be addressed in more detail with reference to FIG. 10.

Upon initialization of the window application of the present invention, a context is not stored within context manager 21, therefore, the context is set to a default context. In the multiple context embodiment, a multiple location context is provided for each of the editors in context manager 21. For example, as illustrated in FIG. 10, Case 1 represents the initialization process of the window application. In Case 1, the contexts of the scanner editor, the text-to-speech editor, the OCR editor, and the text editor are set to a default context.

In the present example illustrated in Case 1, if the scanner editor is selected prior to selecting a container, the scanner applet is executed in a default context. That is, the scanner applet will first determine if the present database identification is valid and if the context is suitable for its function. However, in the case of initialization, the scanner applet will not locate a valid identification and, consequently, the scanner editor will function in accordance with a predetermined default environment. The remaining editors, namely, text editor, OCR editor, and text-to-speech editor, if selected upon initialization, operate in the same manner as discussed above for the scanner editor.

In Case 2, a folder container is selected after initialization. The folder applet registers its context as well as its database identification in the multiple context locations of context manager 21. Since the folder context is suitable for all editors operating in the system, the context will be registered with each editor context location. In this manner, each editor can operate within the folder context, and upon completing their function, the editor can deposit the data into a database which has been designated by the identification stored in the context.

Remaining cases 3 and 4 of FIG. 10 illustrate the situation in which the context of a container is not suitable for all editors. In these cases, the editor will utilize the last relevant context for its operation along with its database for depositing data. For example, in Case 3, after the folder window is closed, its context remains stored in context manager 21. Upon selecting a fax message container, the fax message applet overwrites its context into all of the relevant editor locations within context manager 21. As shown in Case 3, the fax message context is relevant for all editors with the exception of the text-to-speech editor and OCR editor. Accordingly, the last relevant context which, in this case, was the folder context will remain as the context of both the text-to-speech editor and the OCR editor.

Similarly, in Case 4, once the fax message window has been closed out, its context will remain registered with context manager 21. But upon selecting the voice message, the voice message applet overwrites its context into the appropriate editor context locations of context manager 21. In Case 4, the voice message context is applicable to the text editor and the text-to-speech editor. However, in the case of the scanner editor, the last suitable context was the fax message context which remains as its context. In addition, the voice message context is also unsuitable for the OCR editor and, accordingly, the OCR editor remains in the last context suitable which is the folder context.

By virtue of the foregoing, multiple context settings provide suitable environments for each editor even if the current context is unsuitable for the currently selected editor. As a result, the editor does not have to function in a default state thereby causing ambiguity for the user.

In the foregoing embodiment, dynamic tool palette display applet 24 operates in a similar manner as described in the first embodiment. That is, dynamic tool palette display 22 is modified in accordance with current context.

THIRD EMBODIMENT

The following is a description of a third embodiment of the present invention in which editor applets are chained or bound together so as to create a "super-editor". In this manner, the current context is passed from one editor to the next editor within the chain as a parameter. As a result, even if a context is not suitable for the first editor function within the chain, that editor can still operate appropriately since the context need only be suitable for the last editor in the chain. That is, the type of data created must be in the context of the container.

Figure 11:
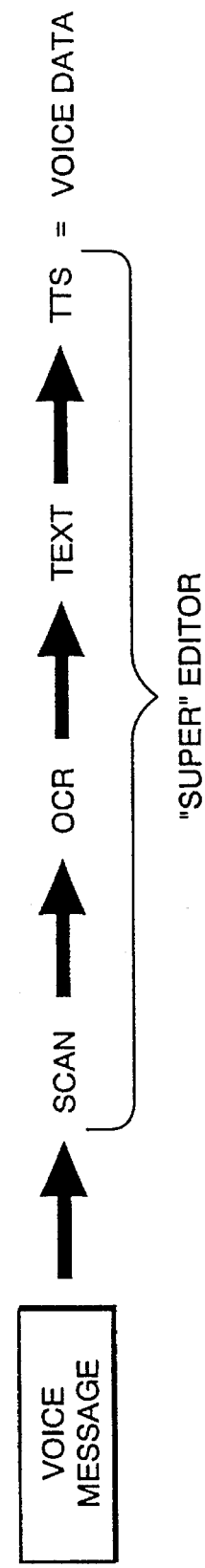
FIG. 11 is a representation of the super-editor embodiment.

As illustrated in FIG. 11, a voice message is registered as the current context. In this example, the super-editor comprises a scanner editor, an OCR editor, a text editor, and a text-to-speech editor. Unlike the previous embodiments, the present embodiment permits the initial editors (scanner, OCR, and text) to operate in a context which is not suitable for processing data in accordance with its editor function. However, the overall super-editor determines whether the current context is suitable for processing the function of an editor which finishes the processing of the data.

In the present example, as shown in FIG. 11, the text-to-speech editor is the final editor to process the data in the voice context. As a result, the process data can be processed according to the voice message context.

In the case of the super-editor, the dynamic tool palette 22 operates in primarily the same way as discussed above with reference to the first embodiment of the invention. That is, the dynamic tool palette applet 24 examines the current context, in this case the voice context, and modifies its display in accordance with that context.

What is claimed is:

1. Method for defining a context environment of a second applet which has been launched from within a first applet and which processes data in conjunction with the first applet, the method comprising the steps of:

first executing step for executing the first applet;

storing a context environment indicative of functional capabilities of the first applet;

second executing step for launching, from within the first applet, the second applet;

examining the stored context environment indicative of the functional capabilities of the first applet; and modifying both functional capabilities of the second applet to be presented to a user and data processing capabilities of the second applet so as to be compatible with the context environment of the first applet examined in the examining step.

2. A method according to claim 1, wherein the examining step includes the step of determining whether the stored context environment is compatible with the processing function of the second applet and, in the case the stored context environment is determined not to be compatible, processing data in accordance with a predetermined default context environment.

3. A method according to claim 2, wherein the modifying step includes the step of maintaining the context environment determined to be compatible with the second applet function until processing by the second applet is complete.

4. A method according to claim 2, further comprising a step of storing data processed by the second applet in a database designated by the stored context environment or by the predetermined default context environment.

5. A method according to claim 4, wherein data processed by the second applet is stored in a container designated by the stored context environment or by the default context environment.

6. A method according to claim 1, wherein the first and second applet functions are user selectable from among a plurality of applets.

7. A method according to claim 6, wherein the plurality of applets are stored in a file server and upon selection of an applet, the selected applet is loaded into a random access memory for execution.

8. A method according to claim 7, wherein each of the plurality of applets either performs an editing function or a container function.

9. A method according to claim 8, wherein the first applet is a container and the second applet is an editor.

10. A method according to claim 1, wherein the first executing step includes the step of displaying a menu for selecting the second applet from among a plurality of applets at a predetermined step in the first applet.

11. A method according to claim 1, wherein the step of storing the context environment indicative of the first applet includes storing a window identification and a database identification of the first applet.

12. A method according to claim 9, wherein the container applet is selected from a plurality of container applets such as an E-mail message, a facsimile message, a folder, and a file cabinet.

13. A method according to claim 9, wherein the editor applet is selected from a plurality of editor applets such as a text editor, a voice editor, and a message editor.

14. A method according to claim 2, wherein the predetermined default environment is a pre-defined container.

15. A method according to claim 1, wherein the step of storing a context environment includes the step of storing the context environment in multiple context environment suitable for the second applet.

16. A method according to claim 1, wherein the second step of executing includes executing a plurality of linked editor applets.

17. A method for using a context environment of a first application by a second application, launched from within the first application, to determine compatible functional capabilities to be presented to a user and to determine how to process data and where to store processed data, the method comprising the steps of:

executing a first application program and storing a context environment indicative of functional capabilities of the first application program;

launching a second application program from within the first application;

examining the stored context environment of the first application program and determining compatible functional capabilities to operate within the context environment;

modifying functional capabilities of the second application program to be presented to a user and modifying data processing of the second application program so as to be compatible with the context environment of the first application program examined in the examining step; and maintaining the functional capabilities and the data processing modifications in the second application program until the second application program has completed its function.

18. An apparatus for defining a context environment of a second applet which has been launched from within a first applet and which is processing data in conjunction with a first applet, comprising:

a memory for storing a plurality of applets; and a processor for 1) selecting a first and a second applet from the memory, 2) executing the first applet, 3) storing a context environment indicative of functional capabilities of the first selected applet, 4) launching, from within the first applet, the second selected applet, 5) examining the stored context environment indicative of the functional capabilities of the first applet, and 6) modifying both functional capabilities of the second applet to be presented to a user and data processing capabilities of the second applet so as to be compatible with the context environment of the first applet based on the result of the examination.

19. An apparatus according to claim 18, wherein the processor determines whether the stored context environment is compatible for processing of the second selected applet and, in the case the stored context environment is determined not to be compatible, the processor processes the second applet in accordance with a predetermined default context environment.

20. An apparatus according to claim 19, wherein the processor maintains the context environment of the second applet until the second applet has completed its function.

21. An apparatus according to claim 19, further comprising a database for storing the data processed by the second applet wherein the database location is designated by the stored context environment or by the predetermined default context environment.

22. An apparatus according to claim 21, wherein the data processed by the second applet is stored in a container designated by the stored context environment or by the default context environment.

23. An apparatus according to claim 18, further comprising a selector for selecting one of the first and second application programs, the selector including an icon display.

24. An apparatus according to claim 23, wherein a plurality of icons are displayed on a monitor in a tool palette and an applet is selected on the basis of the icon image.

25. An apparatus according to claim 18, wherein the memory is a file server for storing a plurality of applets and upon selection of an applet, the selected applet is loaded into a random access memory for execution by the processor.

26. An apparatus according to claim 18, wherein each of the plurality of stored applets either performs an editing function or a container function.

27. An apparatus according to claim 18, wherein the first applet is a container and the second applet is an editor.

28. An apparatus according to claim 18, wherein the context environment stored by the processor includes a window handle and a database identification of the first applet.

29. An apparatus for using a context environment of a first application by a second application, launched from within the first application, in order to determine compatible functional capabilities to be presented to a user and in order to determine how to process data and where to store the processed data, comprising:

memory means for storing application programs;

selection means for launching at least a first application program and a second application program from memory; and processing means for 1) executing the first application program in accordance with the selection means and storing a context environment indicative of functional capabilities of the first application program, 2) executing the second application program from within the first application program in accordance with a selection by the selection means, 3) examining the stored context environment of the first application program and determining compatible functional capabilities to operate within the context environment, 4) modifying functional capabilities of the second selected application program to be presented to a user and modifying data processing of the second application program so as to be compatible with the context environment of the first selected application program, and 5) maintaining functional capabilities and data processing modifications until the second selected application program has completed its function.

* * * * *

UNITED STATES PATENT AND TRADEMARK OFFICE
CERTIFICATE OF CORRECTION

PATENT NO. : 5,548,745

DATED      : August 20, 1996

INVENTORS  : Alistair Egan, et al.

It is certified that error appears in the above-identified patent and that said Letters Patent is hereby corrected as shown below:

COVER PAGE

Under [56] References Cited, U.S. Patent Documents, insert
--5,349,658  9/1994   O'Rourke
  5,450,567  9/1995   Mori et al
  5,442,779  8/1995   Barber et al.--

Under [56] References Cited, Other Publications, insert
--"Supporting Concurrency, Communication, And Synchronization In Human-Computer Interaction-The Sassafras UIMS", R.D. Hill, ACM Transactions On Graphics, Vol. 5, No. 3, July 1986, pages 179-210.

"A Context Knowledge Base To Provide Flexibility For User Interface And Other Management Systems", J.A. Carter, et al., Proceedings Of The 1987 IEEE International Conference On Systems, Man, And Cybernetics, Vol. 1, pages 203-207.--

Signed and Sealed this

Seventeenth Day of December, 1996

Attest:

BRUCE LEHMAN

*Attesting Officer*       *Commissioner of Patents and Trademarks*